Patented Nov. 26, 1929

1,737,491

UNITED STATES PATENT OFFICE

CARL ALFRED BRAUN, OF MUNICH, GERMANY, ASSIGNOR, BY MESNE ASSIGNMENTS, TO AMERICAN BITUMULS COMPANY, OF SAN FRANCISCO, CALIFORNIA, A CORPORATION OF DELAWARE

STABLE AQUEOUS EMULSION AND PROCESS FOR MAKING THE SAME

No Drawing. Application filed December 5, 1925, Serial No. 73,480, and in Germany March 21, 1925.

This invention comprises an aqueous emulsion of any of the general class of high-molecular hydrocarbons (such as bituminous materials, or fatty, oily, tarry, or resinous substances) and a process of making the same.

In preparing aqueous emulsions of fatty, oily or resinous substances or tars or bituminous materials, it is customary to use an emulsifying agent, such as a soap, a gum or a proteid, the amount of the agent bearing some specific ratio to the amount of material emulsified. With the aid of such emulsifying agents stable emulsions can be prepared; without them emulsions have, no doubt, been made, but such an emulsion is of very short duration.

In this specification and the claims appended thereto the expression "emulsifying agent" is intended to mean any emulsifying agent other than alkali; and the expression "normal emulsion" is intended to mean a known aqueous emulsion of the character above specified, in which the amount of emulsifying agent used bears some specific ratio to the amount of material emulsified.

It is an object of this invention to produce, with the minimum amount of emulsifying agent, a stable aqueous emulsion, more particularly of bituminous material, mineral wax or the like.

It is a further object of this invention to provide a process whereby high molecular hydrocarbons may be dispersed into a stable water-external phase emulsion without the use of or dependence upon the presence or action of any emulsifying agent such as heretofore used for effecting such dispersion; a quantity of previously formed water-external phase emulsion being utilized as the means for inducing the emulsion of said hydrocarbons, the water employed as the external phase having an alkalinity such as of itself, and without the presence of such previously formed emulsion, would not be operative to induce emulsification, such preformed emulsion being of a character to possess such emulsifying property when so used.

A further object of this invention is to obtain from the materials of the kind above specified, and emulsion that will pour quite readily, which property is of great practical value for various industrial uses, such as the construction of roads.

It is a further object of the invention to obtain a stable aqueous emulsion from fatty, oily or resinous substances or tars or bituminous materials and alkaline water, in which emulsion the proportion of emulsifying agent of the kind above set forth shall be infinitely small; in other words the emulsion is substantially free from such emulsifying agent.

The invention is based upon the discovery of the fact that an aqueous emulsion of a material of the kind in question will determine the emulsification of the material in alkaline water, although the alkaline water is not in itself an agent which will determine the formation of a stable emulsion of the material.

This newly discovered fact is utilized in the process of this invention, and preferably in the following manner:—A quantity of emulsion of a material having been prepared with aid of a usual emulsifying agent, this emulsion is used as an agent for emulsifying more of the material in slightly alkaline water; a portion of this second emulsion is used for emulsifying a further quantity of the material in alkaline water to produce a third emulsion, some of which is used in like manner to produce a fourth emulsion, and so on. Clearly, an emulsion will ultimately be obtained in which there is no appreciable amount of the original emulsifying agent, and which may therefore be said to be free from emulsifying agent.

The advantage is that a quantity of emulsifying agent serves for emulsifying an unlimited quantity of material in slightly alkaline water; hence the cost of emulsifying agent, which has hitherto been considerable where large quantities of emulsion have had to be made is saved.

Aqueous emulsions prepared according to this invention are suitable as a binding medium in road making or in the manufacture of coal briquettes, or for imparting a preservative coating to stone, wood, metal or the like, as on buildings or fencings; or for impregnating concrete or the like, or for preserving felt and other materials used for roofing.

The following is given as a concrete example of one way of practicing the said process: A small quantity of emulsion is prepared in the first place by melting 10 kilos of mineral ("Montan") wax at the lowest possible temperature and stirring into the molten mass 400 grams of gum arabic dissolved in 600 cc. of alkaline water, about 50 litres of hot alkaline water being added at the same time. The amount of alkali in the water may be the equivalent of about 0.1 per cent of NaOH; it should not be much greater than this, 0.2 per cent for instance, being generally too high for satisfactory emulsification. This first batch of emulsion now serves as a basis for making further emulsion. If for example another 10 kilos of mineral wax be melted, this can be emulsified with the first prepared emulsion merely by the continued addition of alkaline water of the strength above mentioned to-wit: 0.1% of NaOH to 0.2% computed upon the total amount of the emulsion. If in turn a small portion of this newly prepared emulsion be taken it may serve for preparation of emulsion in a similar manner without any further use of the original emulsifying agents (in this case gum arabic), provided alkaline water of the strength above mentioned is used.

Hence the process may be used for the production of emulsion by the continuous repetition, to an indefinite extent, of the operations of separating each completed batch of emulsion into two or more portions and using one portion (or more than one) as an emulsifying agent for the emulsification of additional materials of the kind specified. Thus, for example: a small portion of emulsion is made with aid of any known emulsifying agent and while this is stirred in a vessel the material to be emulsified and alkaline water of the strength above mentioned are run into the vessel in the requisite proportion, the amount so run in being limited solely by the dimensions of the vessel, or being practically without limit if the emulsion is allowed to flow from the bottom of the vessel as fast as the substance to be emulsified and the alkaline water are introduced into the vessel.

The product of the above described process may be distinguished from other products of the same general class heretofore in use by one or more of the following characteristics:

First, it has the property of relatively high stability. For whereas many emulsions quickly break or separate into their constituents, and cannot withstand transportation, the product of this process can be kept in suitable containers for a relatively long period of time, and it has been transported great distances, in one case as far as three thousand miles, without detriment. The emulsion when in storage sometimes loses its uniform consistency as the effect of long standing, becoming thinner at the top of the vessel, and more viscous at the bottom; but it does not break, or in other words, does not cease to be an emulsion. Moreover, in such case the uniform consistency of the emulsion can be quickly restored by mere stirring or other form of agitation. But notwithstanding that the product of this process is characterized by such exceptionally high stability under ordinary conditions of transportation and storage in closed vessels, it has nevertheless the property of breaking almost immediately when poured upon the materials (such as concrete for roads) whereof the asphalt or other dispersed substance is to serve as a binder or as a covering.

Second, the product of the herein described process is distinguished by the fact that it contains no appreciable quantity of the original emulsifying agent; seeing that, after the operations above described have been repeated a comparatively small number of times, the amount of the emulsifying agent employed in making the original batch (or what is sometimes called the "stock emulsion") is so small that its presence cannot be detected by any known test. It is therefore correct to define it as being practically free from emulsifying agent.

Third, said product is distinguished by having an alkaline content such as in and of itself would be inoperative to form an emulsion. This characteristic is of much importance in view of a known process wherein it is proposed to use alkali as an emulsifying agent. For in such case it is necessary, in order to produce even a very unstable emulsion, and from specific materials, to employ a degree of alkalinity which would cause the present process to fail altogether.

Fourth, said product is distinguished by its relatively great fluidity, or capacity to pour readily as compared with melted bitumen. This property is exceedingly important both from the point of view of economy, and also from that of the quality of the final product in the making of which the emulsion is used.

Fifth, said product is further distinguished by the property it possesses of acting as an emulsifying agent for high-molecular hydrocarbons, such as specified herein, when the water of emulsion has an alkalinity of the strength above indicated.

As has already been stated, the herein described process is applicable to a wide range of materials, such as bituminous substances, and fatty, oily, tarry, or resinous substances. These may be, for convenience, designated as "high-molecular hydrocarbons". When therefore, that expression occurs in the following claims, it is to be taken as embracing materials in general of the classes just specified.

It is to be understood that by the expression "aqueous emulsion" in this specification and in the appended claims is meant an emulsion in which the water constitutes the external phase.

Having thus described the nature of the said invention and the best means I know of carrying the same into practical effect, I claim:—

1. A process of making aqueous emulsions of high molecular hydrocarbons which consists in mixing together a quantity of a previously made emulsion containing no component in quantity capable of acting as the emulsifying agent in said process, alkaline water, and a quantity of said hydrocarbon, the total amount of emulsifying agent, other than said previously made emulsion, present in the mixture being inoperative to make a normal emulsion of the materials constituting said mixture, said previously made emulsion being of such character as to have the property of coacting with such alkaline water to effect such emulsification.

2. A process of making aqueous emulsions of high molecular hydrocarbons which consists in mixing together a quantity of a previously made emulsion containing no component in quantity capable of acting as the emulsifying agent in said process, alkaline water, and a quantity of said hydrocarbon, the total amount of emulsifying agent, other than said previously made emulsion, present in the mixture being inoperative to make a normal emulsion of the materials constituting said mixture, then making more emulsion by mixing together a quantity of said last made emulsion, more alkaline water, and more of said hydrocarbon, the total amount of emulsifying agent, other than said previously made emulsion, present in this last named mixture being inoperative to make a normal emulsion of the materials constituting said mixture, said previously made emulsion being of such character as to have the property of coacting with such alkaline water to effect such emulsification.

3. A process of making aqueous emulsions of high molecular hydrocarbons which consists in mixing together a quantity of a previously made emulsion containing no component in quantity capable of acting as the emulsifying agent in said process, water having a slightly NaOH alkalinity and a quantity of said hydrocarbon, the total amount of emulsifying agent, other than said previously made emulsion, present in the mixture being inoperative to make a normal emulsion of the materials constituting said mixture, said previously made emulsion being of such character as to have the property of coacting with such alkaline water to effect such emulsification.

4. A process of making aqueous emulsions of high molecular hydrocarbons which consists in making an emulsion by the use of a known emulsifying agent, then making more emulsion by mixing together a quantity of said previously made emulsion, alkaline water, and a quantity of said hydrocarbon, the total amount of emulsifying agent, other than said previously made emulsion, present in the mixture being inoperative to make a normal emulsion of the materials constituting said mixture, said previously made emulsion being of such character as to have the property of coacting with such alkaline water to effect said emulsification and containing no component in quantity capable of acting as the emulsifying agent in said process.

5. A process of making aqueous emulsions of high molecular hydrocarbons which consists in using as an emulsifier a quantity of a previously formed emulsion containing no component in quantity capable of acting as the emulsifying agent in said process, agitating therewith high molecular hydrocarbons and alkaline water, the alkalinity of said water being inoperative of itself to emulsify said material, the emulsification thereof being effected without the addition of any other agent acting as an emulsifier, said previously formed emulsion being of such character as to have the property of coacting with such alkaline water to effect such emulsification.

6. A process of making aqueous emulsions of high molecular hydrocarbons which includes mixing together hydrocarbons to be emulsified, alkaline water and a quantity of a previously formed emulsion, said process being characterized in that the emulsification is induced by the presence of said previously formed emulsion containing no component in quantity capable of acting as the emulsifying agent in said process, and in that there is not present any agent capable of forming such emulsion without the action of said previously formed emulsion, said previously formed emulsion being of such character as to have the property of coacting with such alkaline water to effect such emulsification.

7. An aqueous emulsion formed by the process of claim 5 wherein alkaline water constitutes the external phase and high molecular hydrocarbons the dispersed phase, the alkaline content being inoperative of itself to effect the emulsification of said hydrocarbons and there being in the mixture no other agent capable in itself of effecting such emulsification.

In testimony whereof I have signed my name to this specification.

CARL ALFRED BRAUN.